United States Patent Office 2,861,913
Patented Nov. 25, 1958

2,861,913

DERIVATIVES OF DITHIOCARBONIC ACID

Richard Wegler, Leverkusen, and Ferdinand Grewe and Erik Regel, Koln-Flittard, Germany, assignors to Farbenfabriken Bayer Aktiengesellschaft, Leverkusen, Germany, a corporation of Germany No Drawing. Application March 2, 1954
Serial No. 413,717

Claims priority, application Germany March 5, 1953

4 Claims. (Cl. 167—30)

The present invention relates to new fungicides and to a process of making the same; more particularly it relates to neutral esters of dithiocarbonic acid.

The salts of dithiocarbonic acid monoesters, the so-called xanthogenates, exhibit a slight fungicidal activity. The neutral aliphatic esters of dithiocarbonic acid do not have a marked fungicidal efficiency either.

It is an object of the present invention to provide more active fungicides derived from dithiocarbonic acid. Another object is to provide a process for preparing these new fungicides. Other objects will appear hereinafter.

It has now been found that the neutral esters of dithiocarbonic acid having the general formula $$RO.\overset{S}{\underset{\|}{C}}.S.CH_2\text{—aryl—OH}$$

in which RO stands for the radical of an aliphatic or araliphatic alcohol and the phenolic hydroxyl group may be replaced by o-acyl, exhibit excellent fungicidal activity.

Furthermore it has been found that these neutral esters of dithiocarbonic acid may be obtained by reacting xanthogenates with hydroxyarylmethylchlorides.

The hydroxyaryl-methylchlorides employed as starting materials may be prepared directly by chloromethylating phenols containing reaction-inhibiting groups, such as carboxyl-, carbonyl-, nitro- or sulfo-groups, or phenols carrying substituents, such as alkyl groups in both o-positions or in o- and p-position.

Furthermore phenols substituted in both o-positions and the p-position can be chloro-methylated in m-position to the hydroxyl group.

When these hydroxyaryl-methylchlorides are reacted with the xanthogenates in accordance with the invention, high yields of the new fungicides are obtained, the amount of by-products being negligible. The reaction is preferably carried out in alcoholic solution, using the alcohol which was employed in the manufacture of the xanthogenates as the solvent.

In the case of 6-methyl-4-nitro-2-chloromethyl-phenol and potassium-ethyl-xanthogenate, the reaction proceeds according to the following equation:

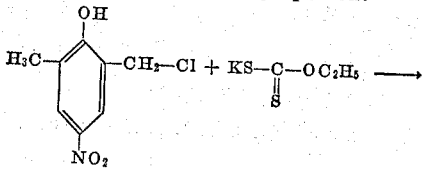

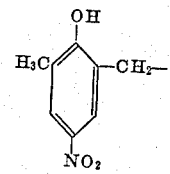

The ease with which the products of the invention are obtained is surprising since in the presence of alkali the chloromethyl phenols very readily react with alcohol to form the corresponding benzyl ether. On the other hand, the corresponding benzyl alcohol is obtained along with the benzyl ether in an aqueous-alcoholic medium. Another reaction which was to be expected is the formation of the corresponding hydroxyaryl-methyl-chloromethylaryl-ether according to the following equation:

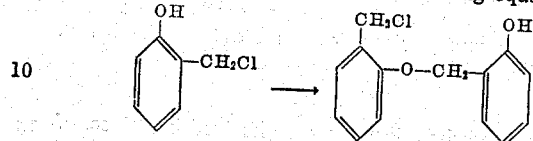

Actually the xanthogenates are so reactive with respect to the chloromethyl compounds that they yield the neutral dithiocarbonic acid esters without the formation of substantial amounts of by-products.

Xanthogenates which are suitable for the process of the invention are the salts of any desired dithiocarbonic acid monoesters; examples of the latter include xanthogenates of methanol, allylalcohol, benzylalcohol, hydroxybenzylalcohol glycolmonomethylether, methylthioglycolether and glycerol.

The neutral esters of dithiocarbonic acid may be substituted in the nucleus of the hydroxyarylmethylester. Moreover the phenolic hydroxyl group may be closed by any desired acyl radical which may enhance their fungicidal activity.

The invention is further illustrated by the following examples without being restricted thereto.

Example 1

32 grams of potassium xanthogenate are suspended in 150 cc. of chlorobenzene and heated under reflux with a solution of 46 grams of 2-chloromethyl-4-nitrophenyl acetate in 150 cc. of chlorobenzene for 15 hours. The yield of S-2-acetoxy-5-nitrobenzyl-xanthogenate amounts to 54 grams of a brown colored oil.

The product is active against Phytophtora infestans on the plant and only slightly phytotoxic. When tested with spores (phyt.) in a concentration of 0.0005%, 90% of the spores are no longer capable to germinate; 55% of the spores lose their germinating capability if the product is applied in a concentration of 0.00025%.

Example 2

30 grams of 2-hydroxy-6-nitrobenzylchloride are suspended in 200 cc. of benzene and stirred with 35 grams of potassium xanthogenate at 20° C. for 15 hours. An oil, which solidifies soon to crystals, is obtained. After recrystallizing from toluene-petroleum ether, crystals of S-2-hydroxy-5-nitro-benzyl-xanthogenate melting at 110° C. are obtained.

The product is active against Phytophtora infestans on the plant and only slightly phytotoxic. When tested with spores (phyt.) in a concentration of 0.0005%, 95% of the spores do no longer germinate; 80% of the spores lose their germinating capability if the product is applied in a concentration of 0.00025%.

Example 3

26 grams of 2-acetoxy-3-nitro-5-chlorobenzylchloride and 20 grams of potassium xanthogenate are mixed with stirring in 200 cc. of benzene at 20° C. for 15 hours. For recrystallizing from butanol 25 grams of S-2-acetoxy-3-nitro-5-chlorobenzyl-xanthogenate in the form of slightly yellow colored needles are obtained. M. P. 80° C.

Example 4

14 grams of 2-chloromethyl-3-chloro-6-nitrophenol and 20 grams of potassium xanthogenate are mixed with stirring in 150 cc. of ethanol at 25° C. for 10 hours. After recrystallizing from ethanol 12 grams of crystals of S-2-hydroxy-3-nitro-6-chlorobenzyl-xanthogenate melting at 92° C. are obtained. When tested with spores in a concentration of 0.0005%, the germination of 75% of the spores is stopped.

*Example 5*

26 grams of 1-chloromethyl-2-hydroxy-3-methyl-5-nitrobenzene and 25 grams of potassium xanthogenate are stirred in 400 cc. of ethanol for 10 hours. The crystals of 2-hydroxy-3-methyl-5-nitrobenzyl-xanthogenate thus obtained are recrystalized from dilute ethanol. M. P. 186° C.

*Example 6*

16.6 cc. of carbon disulfide are dissolved in 100 cc. of methanol and added with cooling to a solution of 14 grams of potassium hydroxide in 100 cc. of methanol; the solution is stirred at 20° C. for one hour. A cold solution of 44.4 grams of 2-chloromethyl-4-nitrophenol in 100 cc. of methanol is added dropwise and the temperature kept at 30° C. The precipitated potassium chloride is filtered off with suction and the filtrate evaporated in vacuum. The yield of S-2-hydroxy-5-nitrobenzyl-O-methyl-xanthogenate amounts to 56 grams of an oil.

When tested with spores (phyt.) in a concentration of 0.0005%, 100% of the spores do no longer germinate; 90% of the spores lose their germinating capability if the product is applied in a concentration of 0.0001%.

*Example 7*

If butanol is substituted for methanol in Example 6 70 grams of S-2-hydroxy-5-nitrobenzyl-O-butyl-xanthogenate in the form of an oil are obtained. The activity of the reaction product is equal to that of Example 6.

*Example 8*

14 grams of potassium hydroxide are dissolved in 100 cc. of water, mixed with 30 grams of isopropanol. Then 17 cc. of carbon disulfide are added dropwise at 5° C. After stirring the mixture for 10 hours 55.5 grams of 2-chloromethyl-4-chloro-6-nitrophenol dissolved in 100 cc. of methanol are introduced into the mixture which is heated to 80° C. for two hours while stirring. 58 grams of S-2-hydroxy-3-nitro-5-chlorobenzyl-O-isopropyl-xanthogenate as an oil are obtained after distilling off the alcohol.

*Example 9*

14 grams of potassium hydroxide are mixed in 100 cc. of water with 44 grams of amyl alcohol and 17 cc. of carbon disulfide are added dropwise at 5° C. After stirring the mixture for 15 hours, 47 grams of 2-chloromethyl-4-nitrophenol dissolved in 100 c. of methanol are introduced into the mixture which is worked up as described in the preceding examples. Thus S-2-hydroxy-5-nitrobenzyl-O-amyl-xanthogenate is obtained.

*Example 10*

20 grams of potassium xanthogenate are suspended in 140 cc. of ethanol. The solution of 21 grams of chloromethylchloroxylenol in 60 cc. of ethanol is dropped slowly into the suspension and the resulting mixture heated to 80° C. for 6 hours. The ethanol is evaporated in vacuum, the solid mass dissolved in ether, the ether solution washed with water and dried. The ether is evaporated and the crystals of 2,6-dimethyl-3-hydroxy-4-chlorobenzyl-xanthogenate are recrystallized from a small quantity of ethanol. M. P. 79° C.

We claim:

1. Fungicides having the formula

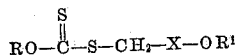

in which R is a lower alkyl radical, R¹ is a member selected from the group consisting of hydrogen and lower acyl radicals having from 1 to 4 carbon atoms and X is a member selected from the group consisting of nitro-substituted phenylene radicals, nitro- and chloro-substituted phenylene radicals, nitro- and lower alkyl-substituted phenylene radicals and chloro- and lower alkyl-substituted phenylene radicals.

2. Fungicides having the formula

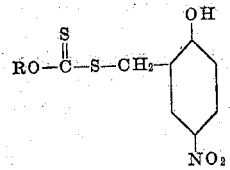

in which R is a lower alkyl radical.

3. A method for combating fungi on plants which comprises the step of applying to the plant a composition containing as an active ingredient a compound having the general formula

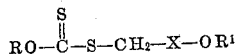

in which R is a lower alkyl radical, R¹ is a member selected from the group consisting of hydrogen and lower acyl radicals having from 1 to 4 carbon atoms and X is a member selected from the group consisting of nitro-substituted phenylene radicals, nitro- and chloro-substituted phenylene radicals, nitro- and lower alkyl-substituted phenylene radicals and chloro- and lower alkyl-substituted phenylene radicals.

4. The process of claim 3 wherein the active ingredient has the formula

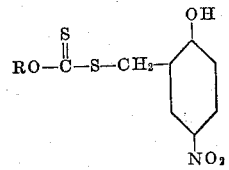

in which R is a lower alkyl radical.

References Cited in the file of this patent

UNITED STATES PATENTS

| | | |
|---|---|---|
| 2,020,021 | Farrington et al. | Nov. 5, 1935 |
| 2,381,483 | Blake et al. | Aug. 7, 1945 |
| 2,696,496 | Craig et al. | Dec. 7, 1954 |

FOREIGN PATENTS

| | | |
|---|---|---|
| 357,600 | France | Nov. 16, 1905 |

OTHER REFERENCES

Bulmer et al.: J. Chem. Soc. (London), 1945, page 673.